US010864568B2

(12) United States Patent
Swedberg

(10) Patent No.: US 10,864,568 B2
(45) Date of Patent: Dec. 15, 2020

(54) TOOL PACK ASSEMBLY

(71) Applicant: Rick Swedberg, Minneapolis, MN (US)

(72) Inventor: Rick Swedberg, Minneapolis, MN (US)

(73) Assignee: Pride Engineering, LLC, Minneapolis, MN (US)

(*) Notice: Subject to any disclaimer, the term of this patent is extended or adjusted under 35 U.S.C. 154(b) by 836 days.

(21) Appl. No.: 15/352,055

(22) Filed: Nov. 15, 2016

(65) Prior Publication Data

US 2018/0133770 A1    May 17, 2018

(51) Int. Cl.
*B21C 51/00* (2006.01)
*B21D 22/28* (2006.01)
*B21D 51/26* (2006.01)

(52) U.S. Cl.
CPC .............. *B21C 51/00* (2013.01); *B21D 22/28* (2013.01); *B21D 22/286* (2013.01); *B21D 51/26* (2013.01)

(58) Field of Classification Search
CPC ........ B21C 51/00; B21D 22/20; B21D 22/30; B21D 22/28; B21D 22/208; B21D 22/286; B21D 24/16; B21D 37/16; B21D 51/26; B21D 51/293; B23Q 17/00; B23Q 17/0985; B23Q 17/0966; G01L 19/0038; G01L 19/147; G01M 3/3281
See application file for complete search history.

(56) References Cited

U.S. PATENT DOCUMENTS

| 3,826,131 | A | * | 7/1974 | Pritschow | .......... B23Q 17/0966 |
| | | | | | 73/862.623 |
| 6,595,045 | B1 | * | 7/2003 | Fuglewicz | .............. B60T 17/08 |
| | | | | | 73/129 |
| 7,107,811 | B2 | | 9/2006 | Zauhar | |
| 9,669,505 | B2 | * | 6/2017 | Angel | ..................... B23Q 17/00 |
| 2010/0232894 | A1 | * | 9/2010 | Burton | ................... B23Q 17/09 |
| | | | | | 408/9 |
| 2013/0139615 | A1 | * | 6/2013 | Kwom | ..................... G01L 5/161 |
| | | | | | 73/862.045 |
| 2017/0209974 | A1 | * | 7/2017 | Angel | ............... B23Q 17/0985 |

* cited by examiner

Primary Examiner — Teresa M Ekiert
(74) Attorney, Agent, or Firm — Eggink & Eggink; Anthony G. Eggink; Katrina M. Eggink

(57) ABSTRACT

A tool pack assembly having sensor plates to measure the temperature of a tool pack forming die and the forces exerted on the forming dies during can production. Each sensor plate tray include at least one temperature sensor and at least one strain sensor for reading and transmitting temperature and strain data relating to the dies of a tool pack assembly. The data read and transmitted may be used to determine the concentricity of the punch of a tool pack assembly during operation making can bodies.

12 Claims, 6 Drawing Sheets

TOOL PACK ASSEMBLY

BACKGROUND OF THE INVENTION

The present assembly relates generally to a can forming tool pack assembly. Particularly, this assembly relates to a data monitoring system having the ability to monitor components within a tool pack assembly. More particularly, the present assembly relates to a sensor plate assembly for placement into a tool pack assembly that reads and transmits data elating to internal tool pack components.

Tool pack assemblies are used in the drawing and ironing of metal blanks to form can bodies for two piece steel and aluminum cans. Tool pack assemblies typically house fixed and/or movable die elements which engage with rapid cycling softer materials carried and positioned about a ram device for decreasing thickness of the material. Spatial control of the die elements along and normal to the axis of movement of the ram, is imperative for manufacturing production, quality and efficiency. The tool pack assemblies and die modules disclosed herein improve these manufacturing parameters by providing data trots the internal tool pack components during can making operations.

SUMMARY OF THE INVENTION

When forming a can body, a can terming punch with can blank material enters a tool pack assembly having a redraw die, ironing dies and spacers. Lateral forces are generated as the punch with can body is forced through the redraw die and each successive ironing die. Sensor plate assemblies disclosed herein located at the redraw die and each ironing the measure and transmit data representing the force placed on each die as the punch with can body passes through the assembly. As the punch forces the can material through the forming die forces produced will be applied onto the sensor plate and these forces nay be measured through the sensor plate assembly. The punch and formed can exit the tool pack assembly and the punch returns through the tool pack without a container formed around it.

Each sensor plate assembly disclosed herein is constructed and arranged to fit within a module of a tool pack assembly. Sensors are used on each sensor plate body to sense the strain or force applied to each can-forming die as a can body is being formed. The signals from these sensors may be processed by circuitry and transmitted for analysis. The sensors ma be in wireless communication, i.e., RFID (Radio Frequency Identification), with a data collection point external to the tool pack assembly, although a wired connection may also be used. The total force on the can forming die can be calculated utilizing individual force signals coming from several sensors at known positions on the sensor plate. Additionally, the differential of the forces between the individual sensors can be utilized to indicate unequal forces on the forming die. These force signals may be electronically processed and used to indicate deficiencies in the can making process.

The inner components of each sensor plate assembly may be sealed from the environment by means of elastomeric seals. A passageway is provided to create a conduit for electrical signal and power supply wires to reach the outer diameter of the tool pack. Electronic circuits and an antenna may be located in a cavity on the outer diameter of the tool pack module. The electronic components and antenna may be mechanically and chemically protected through the use of a curing sealant or the like that fills the cavity and encapsulates the contents of the cavity. The sensor plate assembly may include temperature measuring instruments to measure the temperature of the can forming die and specified portions of the die.

The sensor plate body may contain array of raised surfaces that serve to concentrate the forces of the die force in specific locations around the plate circumference. Sensors may be located opposite to the raised surfaces to thereby sense the strain that is induced from the can forming die.

Data collected from the force and temperature sensors of the sensor plate assemblies may be utilized, for example, to monitor die wear characteristics that can indicate when the tool pack dies and forming punch should be removed from the tool pack for regrinding or replacement. This allows the can-maker to optimize the use of the dies and punches, thereby extending their life span.

Data collected from the force and temperature sensors of the sensor plate assemblies may be utilized, for example, to monitor a lack of, or change in, initial lubrication present on the material being formed and/or to monitor changes in the amount of temperature of, or effectiveness of the coolant flowing through the tool pack components.

Data collected from the force and temperature sensors of the sensor plate assemblies may be utilized, for example, to measure off-center punch strikes and determine and predict out-of-specification body maker moving components.

Data collected from the force and temperature sensors of the sensor plate assemblies may be utilized, for example, to optimize the initial tool park die progression design and/or to indicate raw can material that is out of specification. As the temperature of the can forming dies increases, the diameter of the die increases. Utilizing the temperature of the dies during production, the monitor ng system can vary the amount of cooling introduced into the tool pack to keep a consistent die temperature and thus minimize changes to the die diameter. This allows the can manufacturer, because of the tighter tolerances, to run thinner raw material, thereby reducing production costs.

An advantage of the system described here is the ability to measure the forming die temperature and the forces applied to the die during cart production which allows monitoring critical aspects of the can forming process.

Another advantage is to measure off-center punch strikes through the tool pack which can indicate a body maker, body-maker punch or body-maker components that are out of specification or wearing out of specification.

A further advantage is to measure the temperature of tool pack dies during can production and control or vary the amount of coolant running through the tool pack which can lead to the conservation of coolant and the related enemy consumed to supply the coolant.

These and other advantages of exemplary embodiments of the tool pack assemblies disclosed herein will become clear from the following description by reference to the drawings.

DESCRIPTION OF THE PREFERRED EMBODIMENTS

The tool pack assemblies and die modules disclosed herein provide data from internal tool pack components during can making operations. Temperature and strain sensors are utilized within the tool pack and which are in wireless communication with a data collection point external to the tool pack assembly. The temperature and strain data may be utilized to measure the total force on a tool pack die during equipment operation, to measure the concentricity of the ram or punch with respect to a tool pack die and to thereby detect off-center punch travel through the die set, and to adjust the amount of coolant utilized in the tool pack to insure optimal can body thickness.

The tool pack assembly disclosed herein can measure the temperature of any of the forming dies contained in the tool pack during can production. Temperature may be measured by either non-contact or contact-based temperature measurement. Non-contact temperature measurements can be performed by monitoring the heat profile radiated from the forming die. Contact measurements may be performed by taking direct temperature readings from the monitoring face of a sensor plate.

The tool pack assembly disclosed herein may measure the forces of any of the forming dies contained in the tool pack during can production. Force measuring may be performed by measuring the deflection of the monitoring face of the die holder. The invention includes sensors mounted to the monitoring face that sense the three applied to the monitoring face from the can forming die. The sensors are applied to the monitoring face in a circular array. The sensor array allows the electrical signals generated to indicate both total force and directional forces on the die while the punch and can blank are forced through the die during can production.

Both the temperature and the force data collected are sent from the tool pack to a data collection point on the body maker. This process includes powering the monitoring electronics in the tool pack inductively, and sending and receiving the collected data wirelessly through an antenna embedded in the tool pack components and an antenna located on the body maker.

Figure 1:
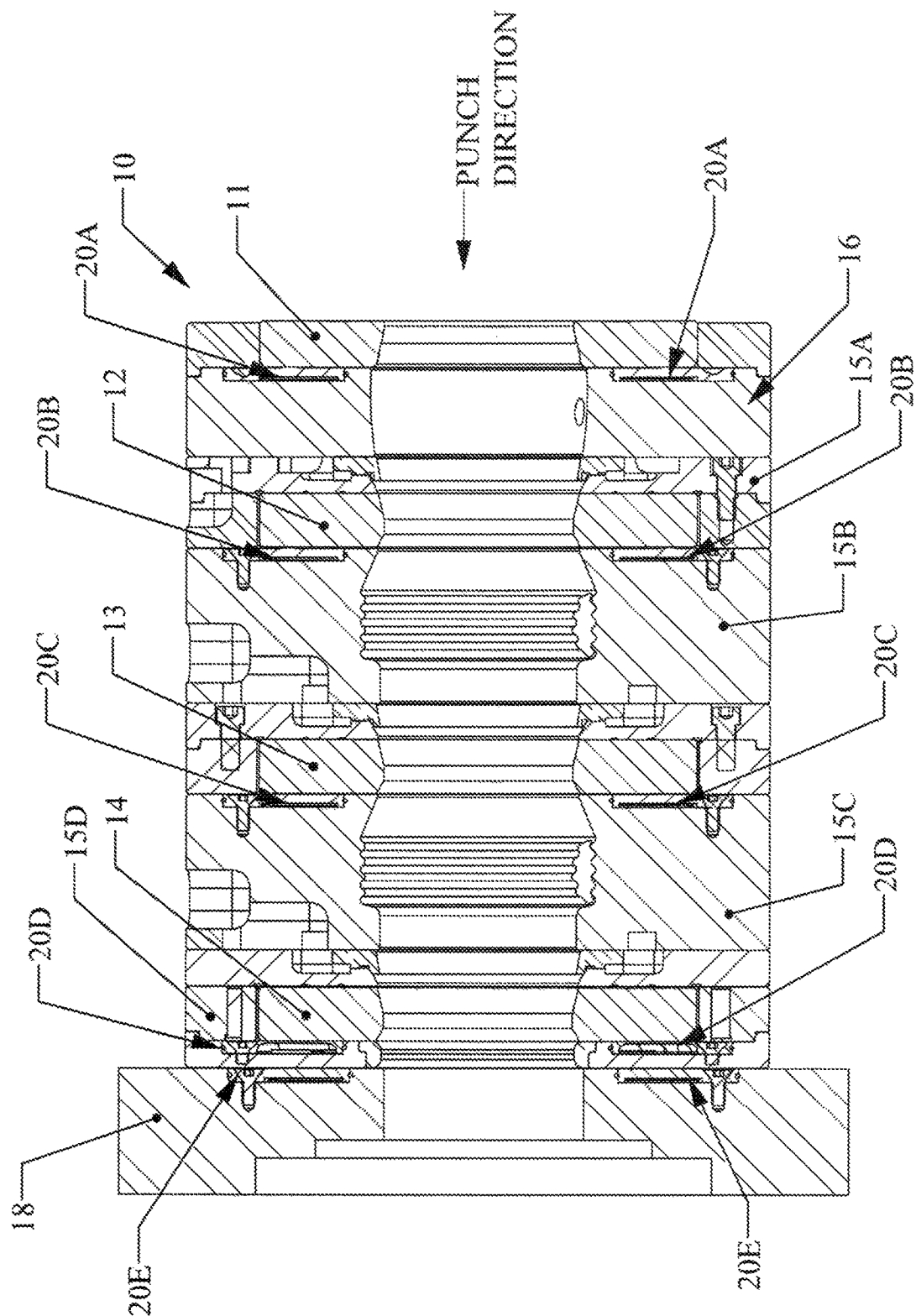
FIG. 1 is a sectional view of a the tool pack assembly with sensor plates.

FIG. 1 shows a cross section of a representative tool pack assembly 10 with examples of sensor plate assemblies 20A-20E in positions to perform their function. The can forming punch enters the tool pack with the can blank material from the right, as indicated in the drawing. As the can raw material is forced through the redraw die 11 and around the punch, lateral forces are generated into the sensing plate 20A within the redraw die carrier 16. These forces are measured and processed as described in the description for FIG. 4. The punch and partially formed can then progress to the first ironing die 12 within the tool pack. Between the can forming dies are coolant spacer assemblies 15A-15D.

As the can material is forced through the ironing die 12, the force is sensed on the sensor plate 20B embedded within the spacer module 15B. These forces are measured and processed as described in the description for FIGS. 2-3. The can forming process is completed through the tool pack assembly as the can-making punch and partially-formed can progress through other can forming die(s), such as second ironing die 13 and third ironing die 14. These forming dies are monitored for forces through sensor plates 20C & 20D mounted into their respective die holders 15C & 15D. Bolster plate 18 provides a fixed, flat surface for the tool pack to be clamped to. Before the can maker is employed, a clamping force is provided to the leading edge of the tool pack assembly. This clamping force ensures all of the tool pack components are firmly seated against each other and the bolster plate during the can-forming process. A sensor plate assembly 20E may be used as with the other tool pack components for sensing total force and also any off-center forces. The can punch and formed can exit the tool pack to the left in FIG. 1. The punch then returns through the tool pack without a formed container formed around it.

Figure 2:
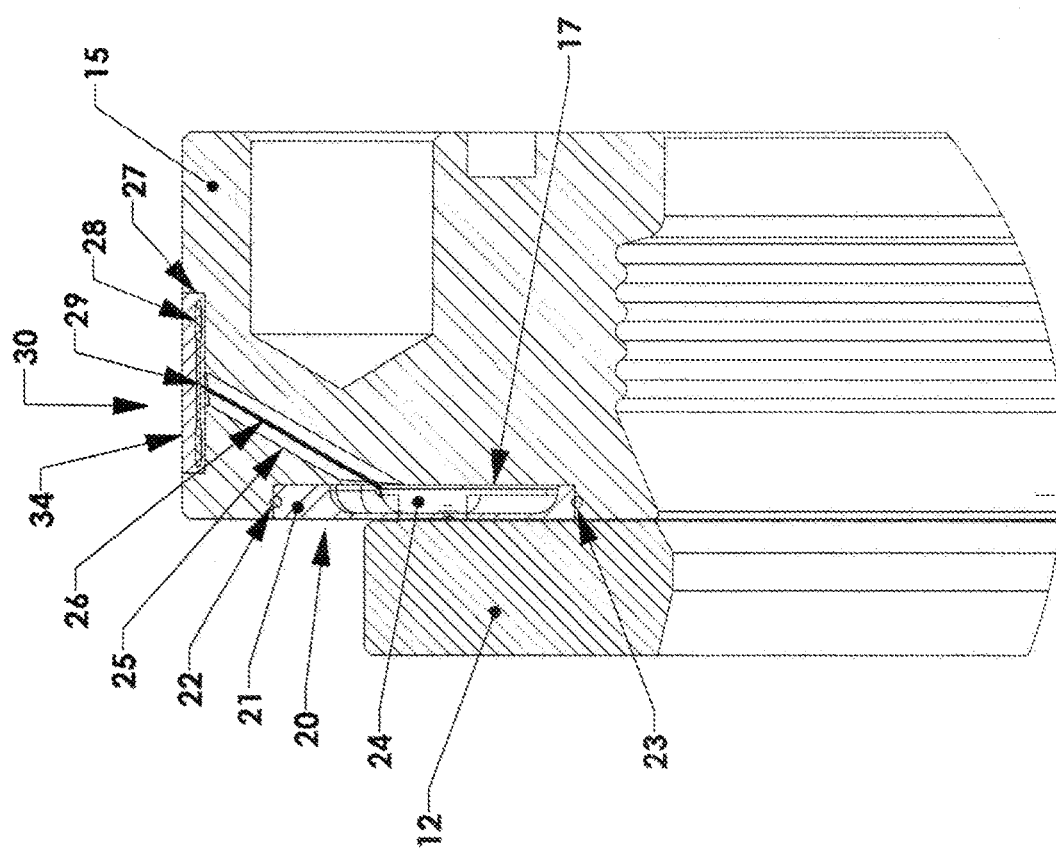
FIG. 2 is a close up sectional view showing the sensor plate assembly in combination with a tool pack spacer in combination with a tool pack spacer forming die.

FIG. 2 shows a cross section of an exemplary tool pack module 15, having the sensor plate assembly 20 installed. Note that sensor plate assembly 20 is ring shaped, so FIG. 2 only shows a cross section through one portion of the ring. The inner components of the sensor plate assembly are sealed from the environment by means of elastomer seals 22 (outer seal) and 23 (inner seal). The sensor plate body 21 fits within an annular channel 17 in tool pack module 15. A passageway 25 extends between the sensor plate 20 and the outer diameter of the tool pack module 15 that creates a conduit for electrical signal and power supply wires 26. External circumferential cavity 27 is located on the outer diameter of the tool pack module and may contain electronic circuits and an antenna 28 or additional antennas (not shown). The electronic component 29 and antenna 28 together comprise electronic element 30, which may be mechanically and chemically protected through the use of a curing sealant 34 that fills the cavity 27 and encapsulates the contents of the cavity. Temperature measuring sensors 24 may exist within the sensor plate assembly 20 that measure the temperature of the can forming die 12. As an example, temperature sensors 24 may be thermocouples, resistance temperature detectors, thermistors, or non-contact temperature sensors. As the punch forces the can material through the forming die 12, from left to right in FIG. 2, the forces produced will be applied onto the sensor plate 20. This force will be measured through the sensor plate assembly 20.

Figure 3:
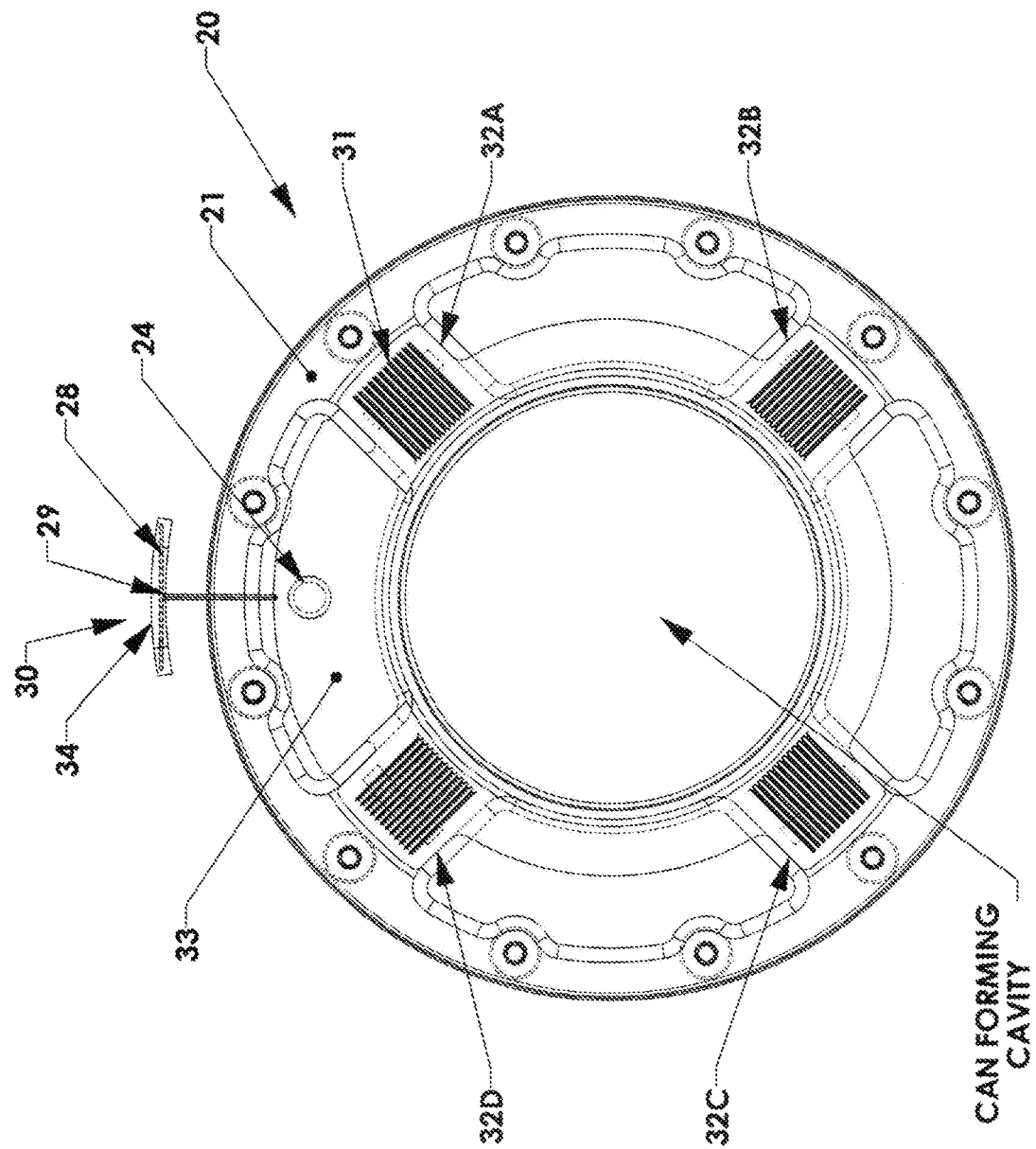
FIG. 3 is a plan view of the sensor plate assembly.

FIG. 3 shows the backside of the sensor plate assembly 20 (that is, the left side of the plate as shown in FIG. 1) and its components. The sensor plate body 21 contains an array of raised die sensing surfaces 35A-35D (on the side of the sensor plate opposite the four strain gauges) that serve to concentrate the forces of the die force in specific locations around the circumference. Strain sensors 31 are applied to strain gauge activating bridges 32A-32D. The strain gauge activating bridges are raised areas that are thicker than the plate between the bridges 32A-32D annularly—in other words, the bridges are raised and the wedge-shaped regions between them are depressions. As discussed, four bridges are shown in FIG. 3 so that total forces as well as forces concentrated on one quadrant of the sensor plate may be measured, in order to e able the system to detect off-center punches.

Strain sensors 31 (four shown, although other configurations are possible) sense the strain that is induced from the can-forming die. The signals from these sensors can be processed on circuitry shared between a circuit board 33 or circuitry 29 residing within the antenna cavity 27. The total force from the can-forming die can be calculated utilizing individual force signals from several sensors 31 at known positions on the sensor plate. Unequal forces on the forming die can be determined utilizing the differential of the forces between the individual sensors 31. These force signals can be electronically processed and used to indicate deficiencies in the can making process.

Figure 4:
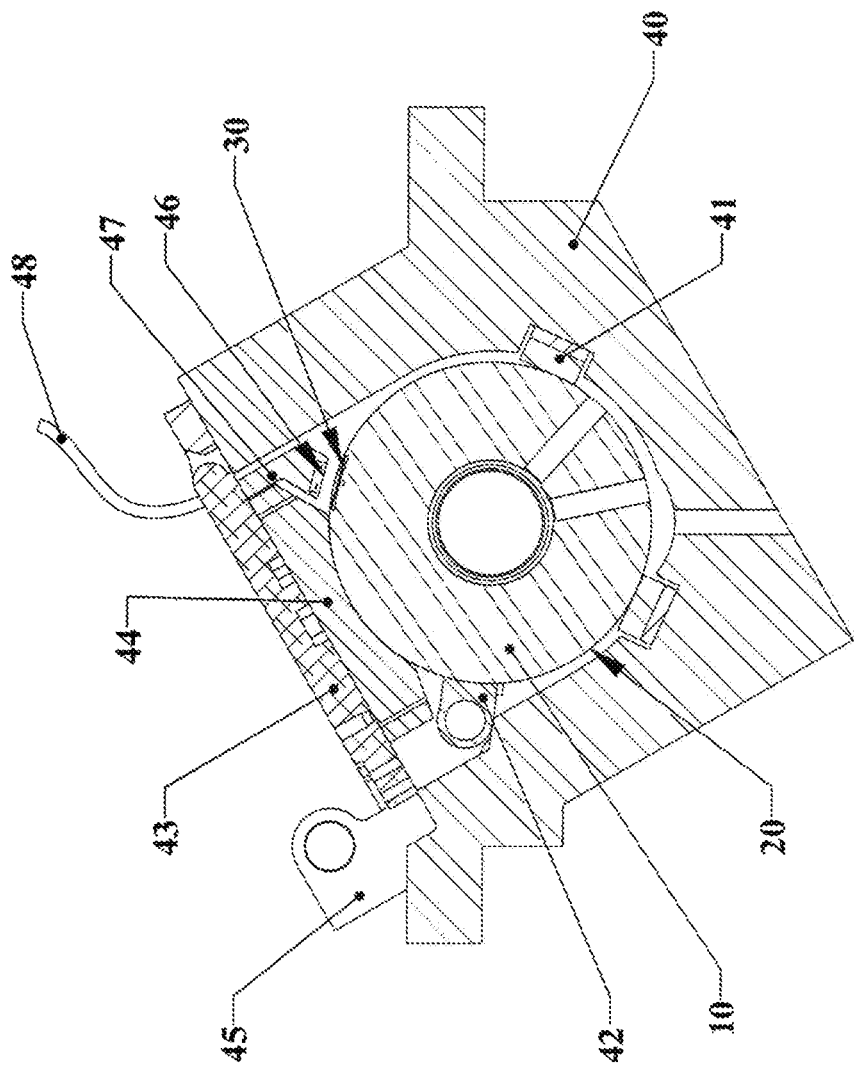
FIG. 4 is a cross sectional view of a tool pack assembly in the body-maker cradle.

FIG. 4 shows an exemplary tool pack assembly 10 with sensor plates 20 installed in operating position within a representative body maker cradle 40. The body maker cradle 40 is the assembly that supports the tool pack assembly 10 in position during the can making process. The tool pack assembly 10 rests precisely within the cradle 40 on guides 41 and is orientated radially on the tool pack handles 42. Coolant and air pass through the body maker cradle lid 43, the body maker cradle lid seal 44 and into the tool pack 10. The body maker cradle lid 43 and the body maker cradle lid seal 44 are held in place mechanically through a latch mechanism 45. An electronic sensing device 46 consisting of an antenna and electronics is mounted into a holder 47 that mechanically supports the sensor near the antennae on the circumference of the tool pack modules. The electronic sensing/antennae device 46 mounted near the tool pack transfers power inductively into the antennas 28 mounted in the sensor plate assemblies 20 located within the tool pack assembly 10. This power is used as the energy source for the electronics within the sensor plate tool pack components through their individual antennas and electronics. The external electronic sensing/antennae device 46 mounted near the tool pack 10 is also utilized to transfer data between the tool pack sensor plate components and the external antenna in device 46 mounted externally to the tool pack assembly 10. The power and data sources are connected to the external antennae through a cable 48. As noted above, however, a wired connection is also possible. If a wired connection is used, a set of wires would be run through the passageway 25 of one or more tool pack modules and across the wireless gap shown between electronic element 30 and electronic sensing/antennae device 46, and from that point, operation of the system would be the same as with a wireless power and data interface.

Figure 5:
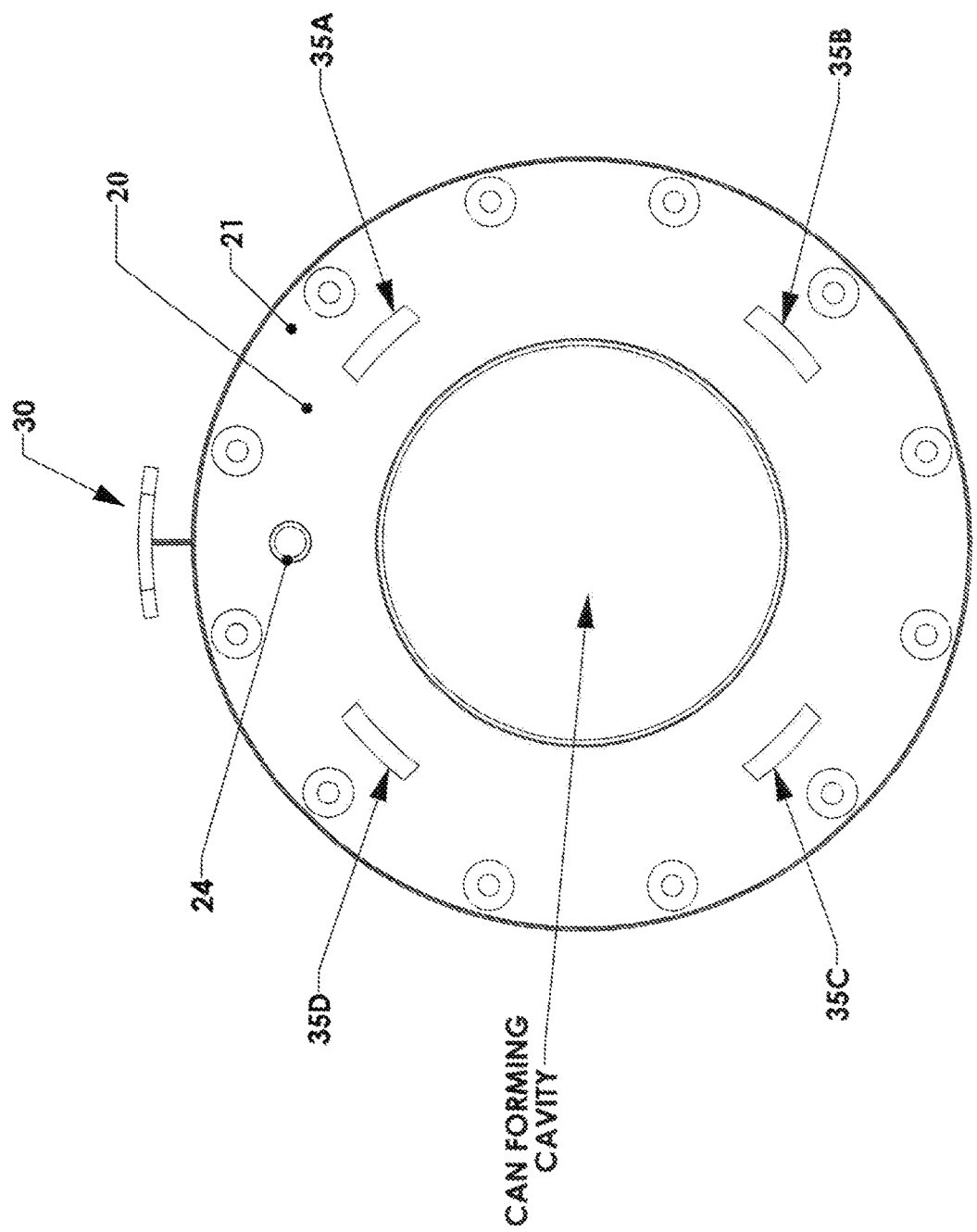
FIG. 5 is another plan view of the sensor plate assembly.

FIG. 5 shows the front of the sensor plate assembly 20 and its components. The sensor plate body 21 contains an array of raised die sensing surfaces 35A-35D that serve to concentrate the forces of the die force in specific locations around the circumference. As discussed above, these surfaces serve to transfer punch forces from the front of the sensor plate to the back side where four corresponding strain gauges are located to measure the forces on the die as the cans are formed. As also discussed, more or fewer strain gauges and corresponding parts (such as 32 and 35) are also possible, depending on requirements. Temperature sensor 24 is also shown. This element may sense temperature by contact with the die, although it may also measure temperature in other locations.

Figure 6:
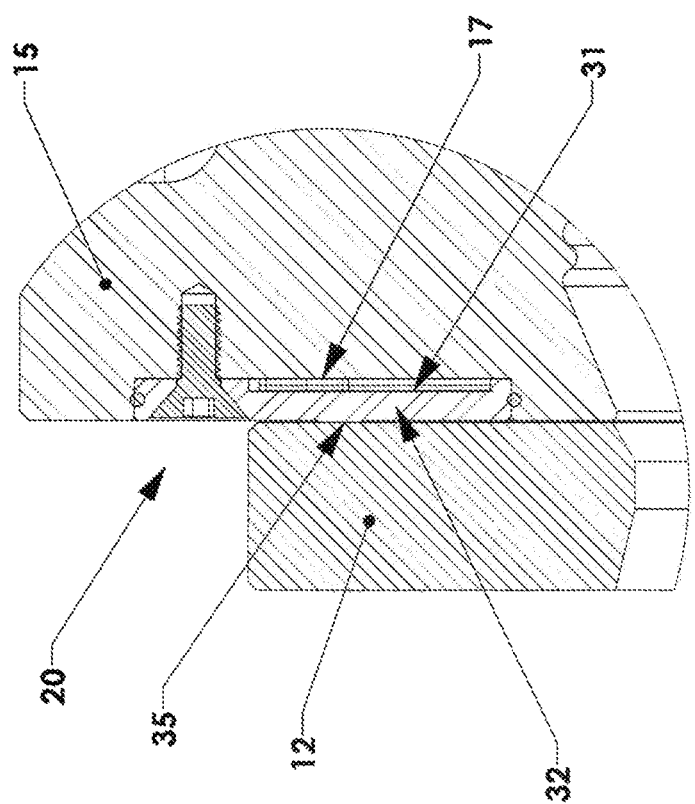
FIG. 6 is a close up view showing a cross section of the sensor plate assembly mounted in a forming die.

FIG. 6 is an enlarged cross sectional view of the sensor plate assembly and related components which shows the sensor plate components already discussed above in more detail.

The force or strain sensors and temperature sensors utilized in the sensor plate assembly of the invention may have various configurations. For example, four strain gauges may be applied to a strain gauge mount. The strain gauges may be mounted individually and wired to a control board or integrated into a single flexible circuit and mounted to the strain gauge mount. An RFID control circuit may either be integrated into the flexible circuit with leads running to the antenna on the outside perimeter of the tool pack module, or the RFID device and antenna may be a single unit epoxied into the module perimeter with leads running into the strain gauges. The RFID system may operate, for example, from a distance of about ⅛" to a distance of about 2.5" from the receiving/sending antenna, although other distances are possible. An antenna mounted in the body maker cradle lid 43 may read between one and six individual RFID enabled forming dies/holders/modules. The antenna mounted in the body maker cradle lid may be electrically and mechanically routed, for example, between six and ten feet to a control system that may then output information via Ethernet IP or other communication system.

The RFID system preferably includes an RFID device or antenna per die module and a receiving RFID antenna in the body maker cradle lid. Each RFID unit preferably includes some memory for data storage and each RFID unit preferably operates without batteries. Temperature readings may be taken approximately once every three to five seconds, although different intervals are possible. Strain gauge readings may provide the total pressure on the die, via the sum of the four-quadrant readings and an individual reading from each of the gauges. The individual readings may be used to provide information regarding punch alignment or realignment with respect to the tool pack.

As many changes are possible to the tool pack assembly embodiments described and shown herein, the descriptions above, and the accompanying drawings should be interpreted in the illustrative and not m the limited sense.

That which is claimed is:

1. A module for use in a tool pack assembly having a series of spaced dies used with a reciprocating can forming punch for the drawing and ironing of metal bodies in the high cyclic manufacture of container bodies, said module comprising:
   a. a generally cylindrical module body with a bore therethrough for the reciprocating can forming punch, an external perimeter wall having a cavity therein, a front face having an annular channel therein and a passageway extending between said annular channel and said cavity in said external perimeter wall;
   b. a sensor plate assembly comprising an annular plate body having at least one strain sensor and at least one corresponding raised surface, said annular plate body configured for placement into said annular channel of said front face of said module body, said at least one raised surface configured to contact one of the dies in the series of spaced dies and to transmit force from the contacted die to said at least one strain sensor; and
   c. an electronic element for placement into said cavity of said external perimeter wall of said generally cylindrical module body, said electronic element in communication with said at least one strain, sensor of said sensor plate assembly.

2. The module for a tool pack assembly of claim 1, wherein said sensor plate assembly further includes at least one temperature sensor.

3. The module for a tool pack assembly of claim 2, wherein said at least one temperature sensor and said at least one strain sensor are in electrical communication with said electronic element in said cavity of said external perimeter wall of said module through said passageway in said module.

4. The module for a tool pack assembly of claim 3, wherein said electronic element is sealed in said cavity of said external perimeter wall of said module body using a curing sealant.

5. The module for a tool pack assembly, of claim 1, wherein said at least one strain sensor comprises a plurality of strain sensors substantially equally spaced around said annular plate body.

6. The module for a tool pack assembly of claim 1, wherein said electronic element is configurable to communicate wirelessly with an external data collection point.

7. A module for use in a tool pack assembly having a series of spaced, annular die modules for contact with a metal body contained on a reciprocating can forming punch for the drawing and ironing of the metal body in the high cyclic manufacture of container bodies, said module constructed and arranged for placement adjacent a die module within the tool pack assembly and having the punch reciprocating therethrough, said module comprising:
   a. a generally cylindrical module body with a bore therethrough, an external perimeter wall, and a front face having an annular channel therein;
   b. a sensor plate assembly comprising an annular, ring-shaped sensor plate body, having a front side and a back side, said front side having a plurality of raised sensing surfaces, said hack side having a plurality of strain sensors, the plate body configured for placement into said annular channel of said front Face of said module body, said back side of said sensor plate body being adjacent said module body and said front side of said sensor plate body positioned facing outward said module body so that said plurality of raised sensing surfaces are positioned adjacent the can forming die module to thereby measure forces caused by the reciprocating can forming punch onto the die module;
   c, an electronic element being in communication with said sensor plate assembly.

8. The module of claim 7, wherein said sensor plate assembly further comprises a temperature sensor.

9. The module of claim 7, wherein said plurality of raised sensing surfaces and said plurality of strain sensors are substantially equally spaced around said annular, ring-shaped sensor plate body.

10. The module of claim 7, wherein said external perimeter wall of said module body has a cavity therein, wherein said electronic element is positioned in said cavity of said external perimeter wall of said module body and wherein said module body further has a passageway extending between said annular channel and said cavity in said external perimeter wall of said module body.

11. The module of claim 10, wherein said electronic element is configured to provide an output signal and wherein said electronic element is in electrical communication with said sensor plate assembly through said passageway in said module body.

12. The module of claim 7, wherein said electronic element is configurable to Communicate wirelessly with an external data collection point.

* * * * *

UNITED STATES PATENT AND TRADEMARK OFFICE
CERTIFICATE OF CORRECTION

Page 1 of 1

PATENT NO. : 10,864,568 B2
APPLICATION NO. : 15/352055
DATED : December 15, 2020
INVENTOR(S) : Rick Swedbeg It is certified that error appears in the above-identified patent and that said Letters Patent is hereby corrected as shown below:

On the Title Page

Column 2, Line 4 In the Abstract, "tray" should be changed to --may--

In the Specification

Column 1, Line 11 "elating" should be changed to --relating--
Column 1, Line 22 "trots" should be changed to --from--
Column 1, Line 27 "terming" should be changed to --forming--
Column 1, Line 33 the first occurrence of the word "the" should be changed to --die--
Column 1, Line 37 "nay" should be changed to --may--
Column 1, Line 47 "ma" should be changed to --may--
Column 2, Line 4 "contain array" should be changed to --contain an array--
Column 2, Line 33 "monitor ng" should be changed to --monitoring--
Column 2, Line 41 "cart" should be changed to --can--
Column 2, Line 50 "enemy" should be changed to --energy--
Column 3, Line 33 "three" should be changed to --force--
Column 4, Line 54 "e able" should be changed to --enable--
Column 6, Line 22 "m" should be changed to --in--

In the Claims

Claim 7, Column 7, Line 15 "hack" should be changed to --back--
Claim 7, Column 7, Line 17 "Face" should be changed to --face--
Claim 7, Column 8, Line 1 "c," should be changed to --c.--
Claim 12, Column 8, Line 22 "Communicate" should be changed to --communicate--

Signed and Sealed this
Sixth Day of April, 2021

Drew Hirshfeld
*Performing the Functions and Duties of the
Under Secretary of Commerce for Intellectual Property and
Director of the United States Patent and Trademark Office*